(12) United States Patent
Soucy et al.

(10) Patent No.: US 9,539,764 B2
(45) Date of Patent: Jan. 10, 2017

(54) USAGE OF A WITNESS MARK TO DISTINGUISH SUPPORT STRUCTURE FROM PART

(71) Applicant: United Technologies Corporation, Hartford, CT (US)

(72) Inventors: Ronald R. Soucy, Tolland, CT (US); Christopher F. O'Neill, Hebron, CT (US); Robert P. Delisle, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 520 days.

(21) Appl. No.: 14/208,848

(22) Filed: Mar. 13, 2014

(65) Prior Publication Data

US 2014/0271221 A1 Sep. 18, 2014

Related U.S. Application Data

(60) Provisional application No. 61/787,520, filed on Mar. 15, 2013.

(51) Int. Cl.
| | |
|---|---|
| *B29C 67/00* | (2006.01) |
| *F01D 5/12* | (2006.01) |
| *B33Y 80/00* | (2015.01) |
| *B33Y 10/00* | (2015.01) |
| *F01D 5/14* | (2006.01) |

(52) U.S. Cl.
CPC ....... *B29C 67/0077* (2013.01); *B29C 67/0092* (2013.01); *B33Y 10/00* (2014.12); *B33Y 80/00* (2014.12); *F01D 5/12* (2013.01); *F01D 5/14* (2013.01); *F05D 2230/30* (2013.01); *F05D 2230/50* (2013.01)

(58) Field of Classification Search
CPC . B29C 67/0077; B29C 67/0092; B33Y 10/00; B33Y 80/00; F01D 5/12; F01D 5/14
USPC ........................................ 416/241 R; 264/157
See application file for complete search history.

(56) References Cited

U.S. PATENT DOCUMENTS

| | | |
|---|---|---|
| 5,876,767 A | 3/1999 | Mattes et al. |
| 5,900,170 A | 5/1999 | Marcin, Jr. et al. |
| 5,904,890 A | 5/1999 | Lohner et al. |
| 5,948,342 A | 9/1999 | Nakazawa et al. |
| 5,985,204 A | 11/1999 | Otsuka et al. |
| 6,085,122 A | 7/2000 | Manning |
| 6,136,257 A | 10/2000 | Graf et al. |
| 6,143,378 A | 11/2000 | Harwell et al. |

(Continued)

*Primary Examiner* — Kevin Lee
(74) *Attorney, Agent, or Firm* — Kinney & Lange, P.A.

(57) ABSTRACT

A component includes a support structure made with an additive manufacturing process with a first end and a second end, and an object made with an additive manufacturing process with a first end and a second end, where the first end of the object is attached to the second end of the support structure. A cross-sectional area of the first end of the object is larger than a cross-sectional area of the second end of the support structure. A method of making an object, the method includes manufacturing a support structure with an additive manufacturing process. An object is manufactured on top of and connected to the support structure with an additive manufacturing process, wherein there is a witness mark created between the support structure and the object. The witness mark is identified. The object is separated from the support structure along the witness mark.

20 Claims, 4 Drawing Sheets

(56) References Cited

U.S. PATENT DOCUMENTS

| | | | |
|---|---|---|---|
| 6,203,861 B1 | 3/2001 | Kar et al. | |
| 6,215,093 B1 | 4/2001 | Meiners et al. | |
| 6,269,540 B1 | 8/2001 | Islam et al. | |
| 6,391,251 B1 | 5/2002 | Keicher et al. | |
| 6,993,848 B2* | 2/2006 | Snyder, Sr. et al. | B23B 5/167 33/21.3 |
| 7,413,001 B2* | 8/2008 | Wang | B22C 9/10 164/361 |
| 8,460,755 B2 | 6/2013 | Rodgers | |
| 9,183,325 B2* | 11/2015 | Wighton et al. | B29C 67/0092 |
| 2010/0320701 A1 | 12/2010 | Groom | |
| 2013/0164960 A1 | 6/2013 | Swanson et al. | |
| 2013/0276461 A1* | 10/2013 | Propheter-Hinckley et al. | F01D 5/16 60/806 |
| 2016/0144434 A1* | 5/2016 | Burd | B22F 3/1055 419/9 |

* cited by examiner

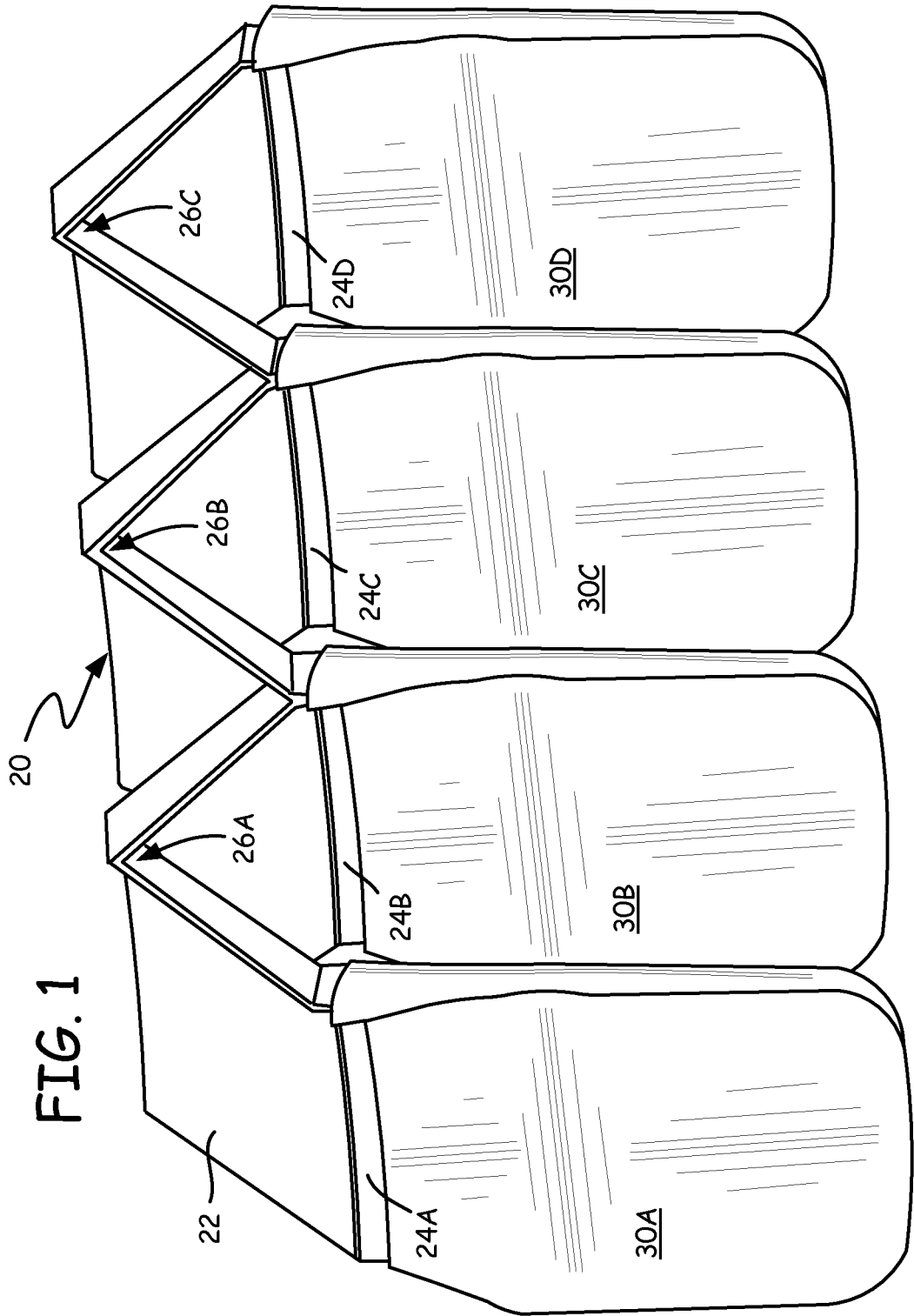

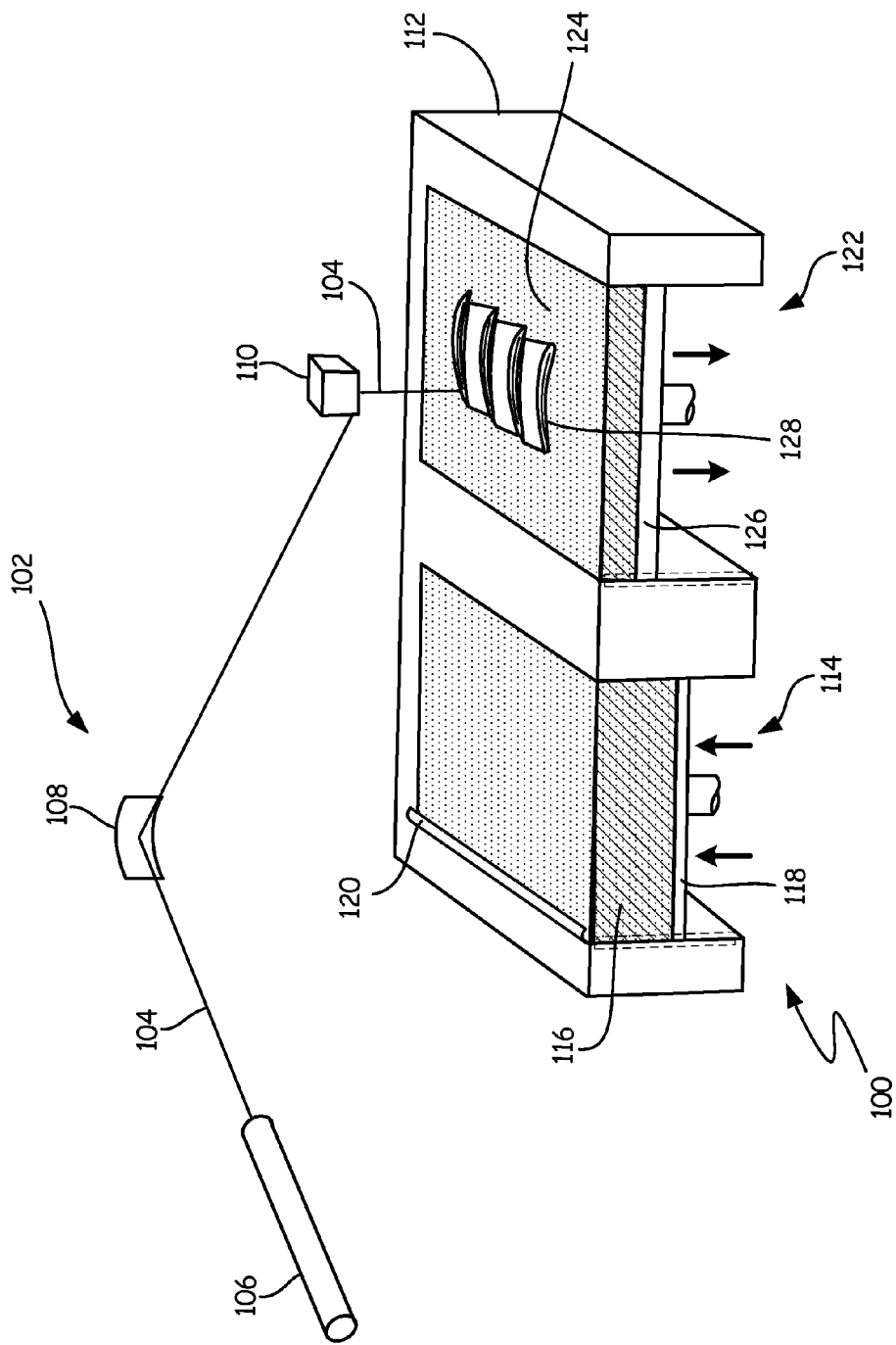

USAGE OF A WITNESS MARK TO DISTINGUISH SUPPORT STRUCTURE FROM PART

CROSS-REFERENCE TO RELATED APPLICATION(S)

This application is a non-provisional patent application of U.S. provisional Application Ser. No. 61/787,520, filed Mar. 15, 2013. All references are incorporated herein.

BACKGROUND

The present invention relates to an additive manufacturing process, and in particular, to forming a witness mark on a component manufactured with an additive manufacturing process. Additive manufacturing processes manufacture components in a layer-by-layer fashion. Additive manufacturing processes work by first using a computer program to break a component into layers. Next, a layer of a powder material can be deposited on a work station. A first layer of the component can then be solidified using an additive manufacturing process, including but not limited to, stereolithography, electron beam melting, or laser powder deposition. This process can be repeated and the component will be built layer-by-layer until it is completed.

When using additive manufacturing processes, some parts are delicately shaped and cannot withstand the stresses of an additive manufacturing process on their own. Under these conditions, a support structure can be used to support the part during manufacturing. After the part is completed, the support structure can then be separated from the part using any technique known in the industry. One issue that arises when using a support structure during an additive manufacturing process is that it is difficult to determine where the part and the support structure should be separated after the additive manufacturing process is completed.

SUMMARY

According to the present invention, a component includes a support structure made with an additive manufacturing process with a first end and a second end, and an object made with an additive manufacturing process with a first end and a second end, where the first end of the object is attached to the second end of the support structure. A cross-sectional area of the first end of the object is larger than a cross-sectional area of the second end of the support structure.

An additively manufactured component includes an object with a proximate end and a distal end, wherein the proximate end is attached to a sacrificial support. The object and sacrificial support are manufactured with an additive manufacturing process. The proximate end of the object has a cross-sectional area that is larger than a cross-sectional area of the sacrificial support it is attached to.

A method of making an object includes manufacturing a support structure with an additive manufacturing process. An object is manufactured on top of and connected to the support structure with an additive manufacturing process, wherein there is a witness mark created between the support structure and the object. The witness mark is identified. The object is separated from the support structure along the witness mark.

BRIEF DESCRIPTION OF THE DRAWINGS

FIG. 1 is a perspective view of a support structure for airfoils.

FIG. 3 is a cross-sectional perspective view of an additive manufacturing process.

DETAILED DESCRIPTION

Figure 2A:
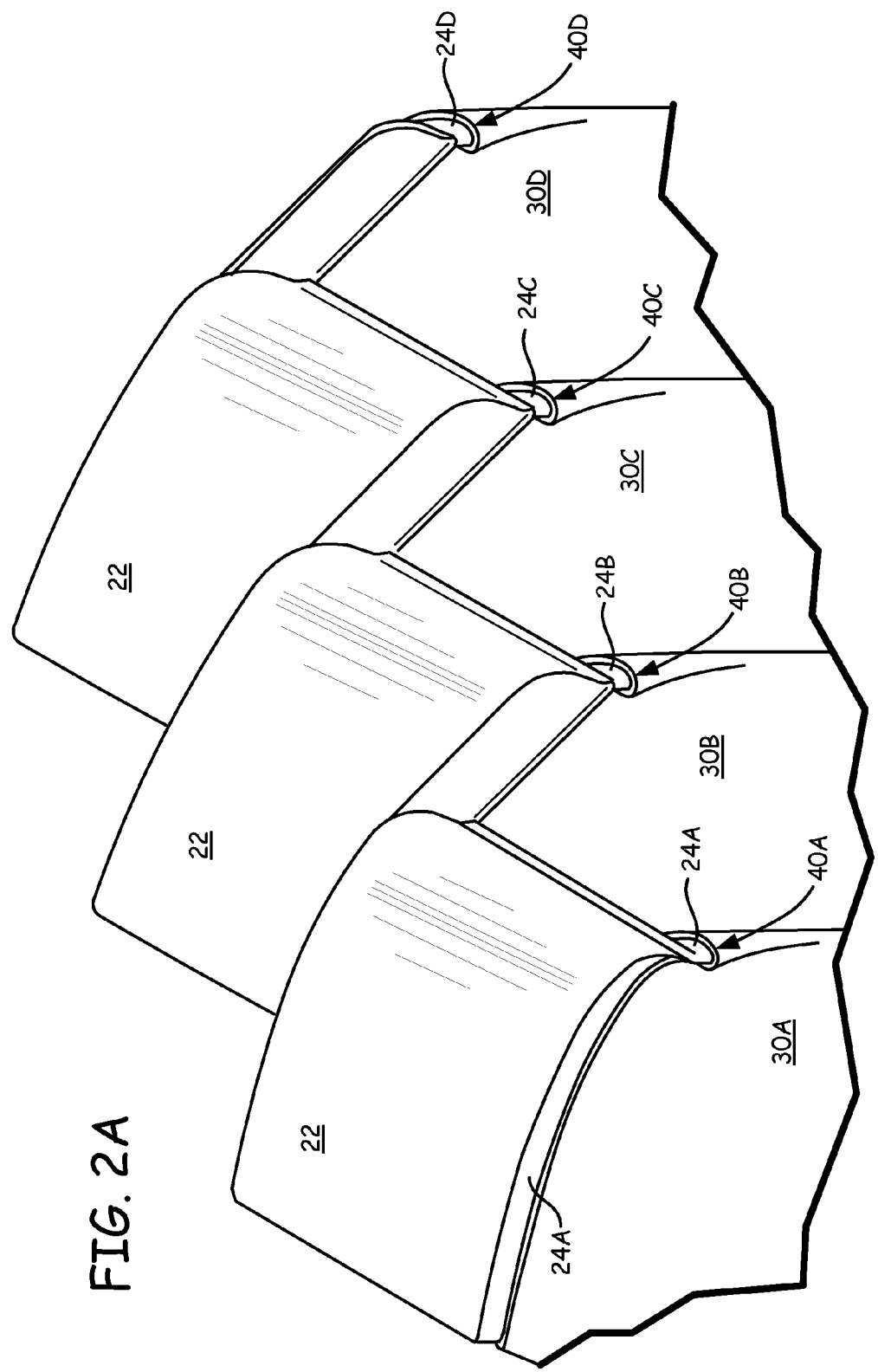
FIG. 2A is a cut-away perspective view of a support structure for airfoils showing a witness mark.

In general, the present invention relates to forming a witness mark on a part during an additive manufacturing process. Additive manufacturing processes put a lot of stress, including shrinkage stress, on parts that are being manufactured. Some delicately shaped parts cannot withstand these stresses on their own so they are manufactured with a support structure and then separated from the support structure after the manufacturing process is complete. One issue that arises when using a support structure is that it is difficult to determine where the part and support structure should be separated after the part is manufactured. Creating a witness mark between the part and support structure during the manufacturing process can prevent this issue, as a witness mark provides a visual indicator that can be used to determine where the part should be separated from the support structure.

FIG. 1 is a perspective view of support structure 20 for airfoils 30. Support structure 20 includes base portion 22, connecting portions 24 (including connecting portion 24A, connecting portion 24B, connecting portion 24C, and connecting portion 24D), and support angles 26 (including support angle 26A, support angle 26B, and support angle 26C). Airfoils 30 include airfoil 30A, airfoil 30B, airfoil 30C, and airfoil 30D.

Support structure 20 and airfoils 30 are formed with an additive manufacturing process in the embodiment shown. Support structure 20 is shown as a support for airfoils 30 in the embodiment shown. In alternate embodiments, support structure 20 can support any object that is capable of being formed with an additive manufacturing process. Support structure 20 supports four airfoils 30A-30D in the embodiment shown, but can support any number of airfoils 30 in alternate embodiments.

Support structure 20 includes base portion 22. Base portion 22 consists of a number of interconnected shaped parts. At an apex of each shaped part is support angle 26. Support angle 26A is formed at the apex of the shaped part between airfoil 30A and 30B; support angle 26B is formed at the apex of the shaped part between airfoil 30B and 30D; and support angle 26C is formed at the apex of the shaped part between airfoil 30C and 30D. Support angles 26A, 26B, and 26C are uniform angles of the same size. Having uniform support angles 26A-26C minimizes shrinkage stresses that are put on airfoils 30 during additive manufacturing processes.

Support structure 20 also includes connecting portions 24A-24D. Connecting portions 24A-24D connect support structure 20 to airfoils 30A-30D. Connecting portion 24A connects to airfoil 30A, connecting portion 24B connects to airfoil 30B, connecting portion 24C connects to airfoil 30C, and connecting portion 24D connects to airfoil 30D. Connecting portions 24A-24D have a curved shape and extend away from base portion 22 of support structure 20. The shape of connecting portions 24A-24D mimics the shape of a first end of airfoils 30A-30D, so that airfoils 30A-30D can be built on and attached to connecting portions 24A-24D during manufacturing.

Support structure 20 is used to support airfoils 30A-30D during additive manufacturing processes. Some delicately shaped parts, like airfoils 30A-30D, cannot withstand the stresses put on them during additive manufacturing processes and would collapse during manufacturing without the use of support structure 20. Support structure 20 provides a base that airfoils 30A-30D can be connected to and a base that can withstand the stresses of an additive manufacturing process. After airfoils 30A-30D are manufactured with an additive manufacturing process, they can be separated from support structure 20 using any technique that is known in the art. One problem that arises when trying to separate support structure 20 from airfoils 30A-30D is that it is hard to determine where the separation line between support structure 20 and airfoils 30A-30D is. To solve this problem, the present application discloses creating a witness mark between support structure 20 and airfoils 30A-30D to provide a visual indicator showing where the two parts can be separated, as seen in FIGS. 2A-2B.

Figure 2B:
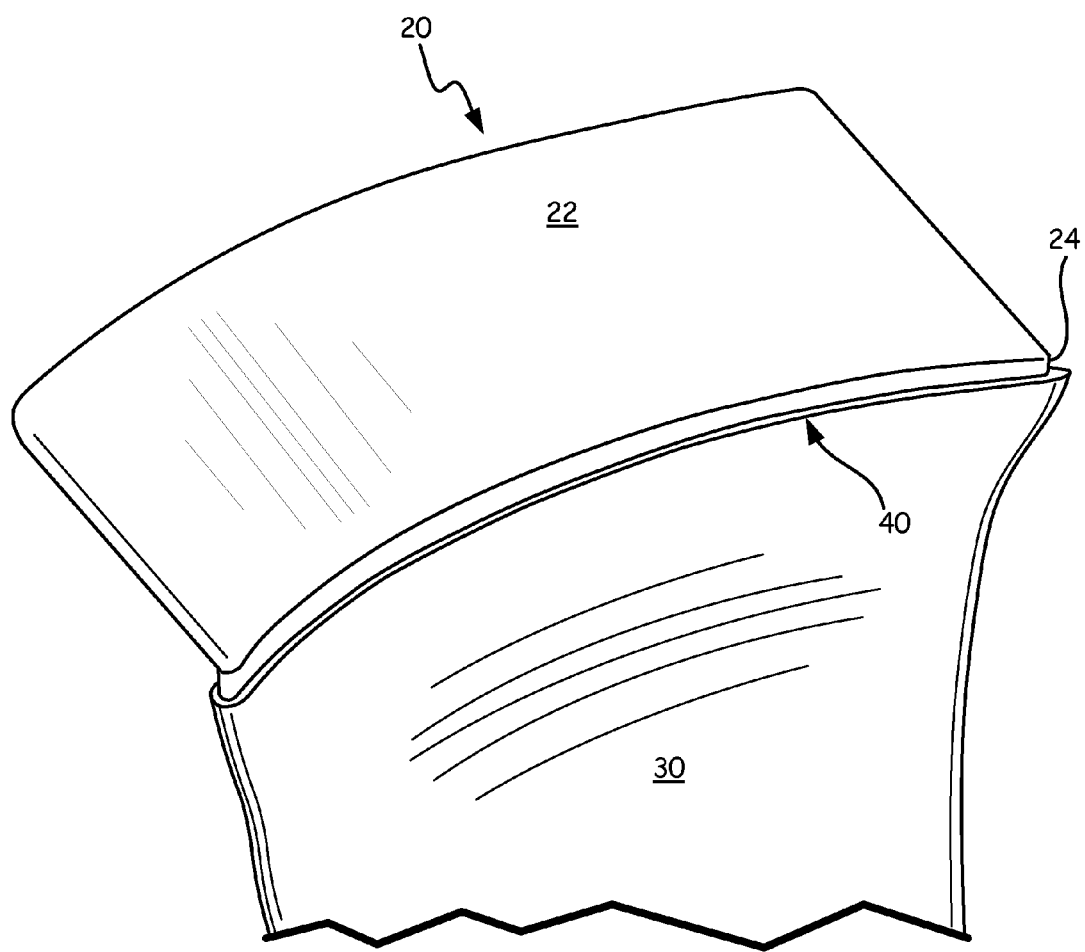
FIG. 2B is a cut-away perspective view of a support structure for airfoils showing a witness mark.

FIG. 2A is a cut-away perspective view of support structure 20 for airfoils 30 showing witness marks 40. FIG. 2B is a cut-away perspective view of support structure 20 for airfoils 30 showing witness mark 40. Support structure 20 includes base portion 22, and connecting portion 24 (including connecting portion 24A, connecting portion 24B, connecting portion 24C, and connecting portion 24D). Airfoils 30 include airfoil 30A, airfoil 30B, airfoil 30C, and airfoil 30D. Witness marks 40 include witness mark 40A, witness mark 40B, witness mark 40C, and witness mark 40D.

Support structure 20 includes base portion 22 and connecting portions 24A-24D. Base portion 22 provides support for support structure 20. Connecting portions 24A-24D extend away from base portion 22 and connect to airfoils 30A-30D. Connecting portion 24A connects to airfoil 30A, connecting portion 24B connects to airfoil 30B, connecting portion 24C connects to airfoil 30C, and connecting portion 24D connects to airfoil 30D. Support structure 20 provides support for airfoils 30A-30D during additive manufacturing processes.

Witness marks 40A-40D are formed between connecting portions 24A-24D and airfoils 30A-30D during manufacturing. Witness mark 40A is formed between connecting portion 24A and airfoil 30A; witness mark 40B is formed between connecting portion 24B and airfoil 30B; witness mark 40C is formed between connecting portion 24C and airfoil 30C; and witness mark 40D is formed between connecting portion 24D and airfoil 30D. In the embodiment shown, witness marks 40A-40D are created between airfoils 30A-30D and connecting portions 24A-24D due to airfoils 30A-30D having a larger cross-sectional area than the cross-sectional area of connecting portions 24A-24D at the connecting point between airfoils 30A-30D and support structure 20. The difference in cross-sectional areas creates a ledge that extends outwards from support structure 20 and creates witness marks 40A-40D. In alternate embodiments, witness marks 40A-40D can be any visual indicator that identifies where support structure 20 can be separated form airfoils 30A-30D.

Witness marks 40A-40D indicate to a user where support structure 20 is attached to airfoils 30A-30D. Witness marks 40A-40D show where a user can separate support structure 20 from airfoils 30A-30D after airfoils 30A-30D are manufactured with an additive manufacturing process. Witness marks 40A-40D are formed during additive manufacturing processes. First, support structure 20 is formed during manufacturing and is built in a layer-by-layer fashion, starting with base portion 22 and then building connecting portions 24A-24D onto base portion 22. After support structure 20 is fully built, airfoils 30A-30D will be built on top of and connected to support structure 20. The first layer of airfoils 30A-30D that is built will have a cross-sectional area that is larger than the cross-sectional area of the last layer of connecting portions 24A-24D. This will create witness marks 40A-40D by forming a small ledge between support structure 20 and airfoils 30A-30D. Airfoils 30A-30D will then be built upon the first layer until they are fully built. Once airfoils 30A-30D are fully built, the completed component, including support structure 20 and airfoils 30A-30D, can be removed from the additive manufacturing process apparatus. At this point, the completed component can undergo additional manufacturing processes if needed, such as heat treating. After the completion of any additional manufacturing processes, airfoils 30A-30D can be separated from support structure 20 along witness marks 40A-40D using any technique known in the art. Support structure 20 is a sacrificial support that can then be discarded. Airfoils 30A-30D will then be ready for use.

Witness mark 40A-40D provides a visual indicator showing where airfoils 30A-30D can be separated from support structure 20. Having a visual indicator is advantageous, as it simplifies the process for separating airfoils 30A-30D from support structure 20. A user does not need specialized knowledge to know where airfoils 30A-30D should be separated from support structure 20, as witness marks 40A-40D indicate the separation lines. Further, witness marks 40A-40D are advantageous, as they can be easily formed during additive manufacturing processes without the need for additional manufacturing process.

FIG. 3 is a cross-sectional perspective view of additive manufacturing process 100. In particular, FIG. 3 shows a direct metal laser sintering apparatus. Additive manufacturing system 100 is one of a variety of additive manufacturing devices that are capable of building airfoils 30A-30D on support structure 20. Additive manufacturing system 100 builds parts in a layer-by-layer fashion, such that finished parts made by additive manufacturing system 100 are monolithic. Additive manufacturing system 100 may be used to build a variety of components as a single solid piece which would require construction in multiple parts using traditional manufacturing processes, or which may have discontinuities or sharp edges due to welding of joints or other traditional manufacturing processes.

Additive manufacturing system 100 includes optical system 102. Optical system 102 includes radiation beam 104, radiation source 106, mirror 108, and movable optical head 110. Radiation beam 104 is a laser beam. Radiation beam 104 emanates from radiation source 106, and travels towards mirror 108. Mirror 108 reflects radiation beam 104 towards movable optical head 110. Movable optical head 110 reflects radiation beam 104 towards a desired target.

Additive manufacturing system 100 also includes frame 112. Frame 112 provides physical support for other components that make up additive manufacturing system 100. Frame 112 may be, for example, a solid metal structure defining interior voids to contain other components of additive manufacturing system 100.

Additive manufacturing system 100 further includes material supply system 114. Material supply system 114 is a system for delivering material used in additive manufacturing. As shown in FIG. 3, material supply system 114 includes sinterable material 116 and supply platform 118. Sinterable material 116 may be, for example, a powdered metal that is at least partially sinterable to form a solid part. Supply platform 118 is a platform that may be raised or lowered with respect to frame 112 in order to facilitate the supply of sinterable material 116.

Additive manufacturing system 100 also includes spreader 120. Spreader 120 is used to transfer sinterable material 116 from supply system 114 to a desired location for additive manufacturing. Spreader 120 can transfer sinterable material 116 to a desired location by rolling sinterable material 116 across a desired location.

Additive manufacturing system 100 also includes build station 122. Build station 122 includes working layer 124 and build platform 126. Working layer 124 consists of a surface layer of sinterable material that is positioned to be sintered by radiation beam 104. Build platform 126 is a platform that is movable with respect to frame 112 in order to facilitate layer-by-layer construction of components by additive manufacturing system 100.

Object 128 is a partially built support structure for airfoils in FIG. 3, as it is being made by additive manufacturing system 100. Object 128 is built by additive manufacturing system 100 as a single component. In alternate embodiments, object 128 can be any support structure for any object.

Radiation beam 104 is directed towards working layer 124 by optical system 102. Radiation source 106 generates a radiation beam, which is deflected by mirror 108 and movable optical head 110 to selectively heat portions of working layer 124. By moving mirror 108 and movable optical head 110, a desired pattern of sintered material may be generated in working layer 124. Typically, a slice or layer of a three-dimensional part is made in working layer 124.

Once the layer is complete, material supply system 114 provides additional sinterable material 116 to build station 122. In particular, sinterable material 116 is positioned above a surface of frame 112 when supply platform 118 is raised. Spreader 120 transfers sinterable material 116 across the surface of frame 112 towards build station 122. Meanwhile, build station 122 prepares to receive sinterable material 116 by lowering build platform 126 by a distance proportional to the amount supply platform 118 was raised. Sinterable material 116 displaces the gap left when build platform 126 was lowered, which results in a new working layer 124 of unsintered sinterable material 116.

By repeating this process multiple times, monolithic objects 128 may be generated in a layer-by-layer manner. This process is only one potential additive manufacturing method for manufacturing support structure 20 and airfoils 30. In other embodiments, there may be powder or liquid sinterable material 116. Additive manufacturing apparatus 100 may alternatively employ stereolithography, electron beam melting, or laser powder deposition, among other forms of additive manufacturing that are known in the field.

POSSIBLE EMBODIMENTS

The following are non-exclusive descriptions of possible embodiments of the present invention.

A component includes a support structure made with an additive manufacturing process with a first end and a second end, and an object made with an additive manufacturing process with a first end and a second end, where the first end of the object is attached to the second end of the support structure. A cross-sectional area of the first end of the object is larger than a cross-sectional area of the second end of the support structure.

The component of the preceding paragraph can optionally include, additionally and/or alternatively, any one or more of the following features, configurations, and/or additional components.

The object can be separated from the support structure after manufacturing.

The support structure is a sacrificial part that can be discarded.

The support structure is capable of support a plurality of objects.

The object is an airfoil.

The support structure has a uniform angle of support to minimize shrinkage stresses on the object during manufacturing.

An additively manufactured component includes an object with a proximate end and a distal end, wherein the proximate end is attached to a sacrificial support. The object and sacrificial support are manufactured with an additive manufacturing process. The proximate end of the object has a cross-sectional area that is larger than a cross-sectional area of the sacrificial support it is attached to.

The component of the preceding paragraph can optionally include, additionally and/or alternatively, any one or more of the following features, configurations, and/or additional components.

The larger cross-sectional area of the object at the proximate end creates a witness mark that identifies where the object can be separated from the sacrificial support.

The witness mark is a ledge that projects outwards and defines the proximate end of the object.

The object can be separated from the sacrificial support along the witness mark.

The sacrificial support can be discarded after separation from the object.

The object and the sacrificial support are manufactured out of a powder material.

A method of making an object, the method includes manufacturing a support structure with an additive manufacturing process. An object is manufactured on top of and connected to the support structure with an additive manufacturing process, wherein there is a witness mark created between the support structure and the object. The witness mark is identified. The object is separated from the support structure along the witness mark.

The method of the preceding paragraph can optionally include, additionally and/or alternatively, any one or more of the following features, configurations, and/or additional components.

The witness mark is a ledge created between the support structure and the object due to the support structure have a smaller cross-sectional area then the object where they are connected.

Manufacturing a support structure with an additive manufacturing process includes (a) depositing a layer of a powder material on a work stage, the layer having a thickness, (b) solidifying a portion of the layer based upon data that defines a shape of the support structure, and (c) lowering the work stage by the thickness. Steps (a)-(c) can be repeated until the support structure is complete.

Manufacturing an object with an additive manufacturing process includes (a) depositing a layer of a powder material on a work stage, the layer having a thickness, (b) solidifying a portion of the layer based upon data that defines a shape of an object, wherein an end of the object is connected to the support structure, and (c) lowering the work stage by the thickness. Steps (a)-(c) can be repeated until the object is complete.

The method of making an object can also include discarding the support structure after separation from the object.

The support structure has a uniform angle of support to minimize shrinkage stress on the object during manufacturing.

The support structure is capable of support a plurality of objects.

The object is an airfoil.

Although the present invention has been described with reference to preferred embodiments, workers skilled in the art will recognize that changes may be made in form and detail without departing from the spirit and scope of the invention.

The invention claimed is:

1. A component comprising:
   a support structure made with an additive manufacturing process with a first end and a second end; and
   an object made with an additive manufacturing process with a first end and a second end, where the first end of the object is attached to the second end of the support structure;
   wherein a cross-sectional area of the first end of the object is larger than a cross-sectional area of the second end of the support structure.

2. The component of claim 1, wherein the object can be separated from the support structure after manufacturing.

3. The component of claim 2, wherein the support structure is a sacrificial part that can be discarded.

4. The component of claim 1, wherein the support structure is capable of support a plurality of objects.

5. The component of claim 1, wherein the object is an airfoil.

6. The component of claim 1, wherein the support structure has a uniform angle of support to minimize shrinkage stresses on the object during manufacturing.

7. An additively manufactured component comprising:
   an object with a proximate end and a distal end, wherein the proximate end is attached to a sacrificial support;
   wherein the object and sacrificial support are manufactured with an additive manufacturing process; and
   wherein the proximate end of the object has a cross-sectional area that is larger than a cross-sectional area of the sacrificial support it is attached to.

8. The component of claim 7, wherein the larger cross-sectional area of the object at the proximate end creates a witness mark that identifies where the object can be separated from the sacrificial support.

9. The component of claim 8, wherein the witness mark is a ledge that projects outwards and defines the proximate end of the object.

10. The component of claim 8, wherein the object can be separated from the sacrificial support along the witness mark.

11. The component of claim 10, wherein the sacrificial support can be discarded after separation from the object.

12. The component of claim 7, wherein the object and the sacrificial support are manufactured out of a powder material.

13. A method of making an object, the method comprising:
   manufacturing a support structure with an additive manufacturing process;
   manufacturing an object on top of and connected to the support structure with an additive manufacturing process, wherein there is a witness mark created between the support structure and the object;
   identifying the witness mark; and
   separating the object from the support structure along the witness mark.

14. The method of claim 13, wherein the witness mark is a ledge created between the support structure and the object due to the support structure have a smaller cross-sectional area then the object where they are connected.

15. The method of claim 13, wherein manufacturing a support structure with an additive manufacturing process further comprises:
   (a) depositing a layer of a powder material on a work stage, the layer having a thickness;
   (b) solidifying a portion of the layer based upon data that defines a shape of the support structure;
   (c) lowering the work stage by the thickness; and
   (d) repeating steps (a)-(c) until the support structure is complete.

16. The method of claim 15, wherein manufacturing an object with an additive manufacturing process further comprises:
   (a) depositing a layer of a powder material on a work stage, the layer having a thickness;
   (b) solidifying a portion of the layer based upon data that defines a shape of an object, wherein an end of the object is connected to the support structure;
   (c) lowering the work stage by the thickness; and
   (d) repeating steps (a)-(c) until the object is complete.

17. The method of claim 13, and further comprising:
   discarding the support structure after separation from the object.

18. The method of claim 13, wherein the support structure has a uniform angle of support to minimize shrinkage stress on the object during manufacturing.

19. The method of claim 13, wherein the support structure is capable of support a plurality of objects.

20. The method of claim 13, wherein the object is an airfoil.

* * * * *